3,022,136
MANUFACTURE OF PHOSPHORIC ACID
Roland Syers, Ilford, England, assignor to Chemical Construction Corporation, New York, N.Y., a corporation of Delaware
No Drawing. Filed July 30, 1958, Ser. No. 751,899
5 Claims. (Cl. 23—165)

This invention is for improvements in or relating to the manufacture of phosphoric acid and has for an object to provide a process for the manufacture of phosphoric acid utilising a sulphuric acid waste liquor, particularly the waste liquor obtainable from the treatment of titanium ores, which liquor is commonly referred to as pickle liquor.

According to the present invention there is provided a process for the manufacture of phosphoric acid which comprises reacting phosphate rock, preferably at an elevated temperature, with an amount of sulphuric acid waste liquor, not exceeding that required for complete reaction, separating off the solid residues and concentrating the phosphoric acid residues.

When the sulphuric acid waste liquor is the pickle liquor arising from the treatment of titanium ores, the liquor contains about 24% by weight of free sulphuric acid together with about 16% by weight of ferrous sulphate and it is a feature of the invention that the said solid residues are washed whilst the phosphoric acid solution is filtered hot and thereafter cooled, whereupon acid iron phosphate ($FeH_4(PO_4)_2$) crystallises out, the washings from the solid residue being combined with the mother liquor which is thereupon concentrated and provides a phosphoric acid which is suitable for the manufacture of ammonium phosphate or for the manufacture of triple super-phosphate. The acid iron phosphate may be added to the ammonium phosphate or triple super-phosphate as a fertilising addendum.

The reaction is preferably carried out at a temperature in the neighbourhood of 80° C.

The product of the reaction is a phosphoric acid which, as above indicated, is suitable for use in the manufacture of phosphate fertilisers together with iron phosphate which is also a valuable fertilising substance.

The following examples illustrate the manner in which the invention may be carried into effect.

Example 1

100 parts by weight of ground Moroccan phosphate rock ($P_2O_5$ content 32% by weight) is mixed with 250 parts by weight of the pickle liquor from the treatment of titanium ores and the reaction mixture is heated to a temperature of 80° C.

Carbon dioxide and hydrogen fluoride are evolved with considerable frothing and, when the reaction has been completed, the reaction mixture is filtered whilst still warm and the filter cake of calcium sulphate is washed with water. The filtrate is cooled and the iron phosphate crystals are separated from the solution to which is then added the washings and the combined aqueous liquid is then concentrated to provide a concentrated aqueous solution of phosphoric acid containing minor amounts of the iron phosphate.

In this example, the iron sulphate in solution has reacted with the calcium dihydrogen phosphate $$Ca_2H_2(PO_4)_2$$

at the same time as the free sulphuric acid is reacted with the tricalcium phosphate.

Example 2

100 parts by weight of ground Florida phosphate rock were mixed with 370 parts by weight of the pickle liquor used in Example 1, the reaction mixture being heated as before to 80° C.

The procedure of Example 1 is followed, leading to the production of a concentrated aqueous phosphoric acid solution suitable for use in the manufacture of phosphate fertilisers.

The procedure of the foregoing examples may be advantageously modified by substituting a further quantity of pickle liquor for water for the step of washing the calcium sulphate filter cake; the wash liquid may then be recycled for use in the treatment of fresh quantities of phosphate rock and avoids the dilution of the phosphoric acid solution in the manner described in the examples and consequently reduces the heat requirements of the process.

I claim:

1. A process for the manufacture of phosphoric acid which comprises reacting phosphate rock with sufficient sulfuric acid waste liquor to produce complete reaction, said liquor containing about 16% by weight of ferrous sulfate and about 24% by weight of free sulfuric acid, heating the reaction mixture to an elevated temperature, filtering said hot reaction mixture to remove solid residue comprising calcium sulfate, cooling the residual solution to crystallize acid iron phosphate ($FeH_4(PO_4)_2$), filtering said cooled solution to remove crystallized solid acid iron phosphate, and recovering a residual phosphoric acid solution mother liqur free of major impurity content.

2. Process of claim 1, in which said solid residue is washed with water, the resulting dilute phosphoric acid solution is combined with said mother liquor, and the resulting combined solution is concentrated to produce strong phosphoric acid.

3. A process according to claim 1 wherein the sulphuric acid waste liquor is the pickle liquor from the treatment of titanium ore.

4. A process according to claim 1 wherein the solid residues are washed with sulphuric acid waste liquor which is recycled for use with fresh phosphate rock.

5. A process according to claim 1 wehrein the reaction is carried out at a temperature of 80° C.

References Cited in the file of this patent
UNITED STATES PATENTS

| | | |
|---|---|---|
| 1,889,949 | Clark | Dec. 6, 1932 |
| 1,940,689 | Moore | Dec. 26, 1933 |
| 2,418,203 | Stauffer | Apr. 11, 1947 |

OTHER REFERENCES

American Potato Journal, "An Evaluation of Sludge-Acid . . . in Potato Fertilizers," Brown et al., vol. 20, publ. April 1943, pp 89–95